219-121 SR

4/3/79 OR 4,147,916

United States Patent [19]

Fairbairn

[11] 4,147,916

[45] Apr. 3, 1979

[54] SPLIT-FLOW NOZZLE FOR ENERGY BEAM SYSTEM

[75] Inventor: Thomas E. Fairbairn, Westland, Mich.

[73] Assignee: Sirius Corporation, Toledo, Ohio

[21] Appl. No.: 673,491

[22] Filed: Apr. 5, 1976

[51] Int. Cl.[2] .................. B23K 9/00

[52] U.S. Cl. .................. 219/121 P; 313/231.4; 219/121 L

[58] Field of Search .................. 219/74, 75, 73, 121 P, 219/121 R, 121 EB; 313/231.3, 231.4, 231.5, 231.6; 128/303.1; 315/111.1

[56] References Cited

U.S. PATENT DOCUMENTS

| | | | |
|---|---|---|---|
| 207,753 | 9/1878 | Lugo | 313/231.7 X |
| 3,300,561 | 1/1967 | Foex | 219/121 P X |
| 3,309,491 | 3/1967 | Jacobs | 219/74 |
| 3,364,387 | 1/1968 | Anderson | 219/121 P X |
| 3,692,973 | 9/1972 | Oku | 219/75 X |
| 3,894,209 | 7/1975 | Fairbairn | 219/121 P |
| 3,947,654 | 3/1976 | Fairbairn | 219/121 P X |

*Primary Examiner*—J. V. Truhe
*Assistant Examiner*—Mark Paschall
*Attorney, Agent, or Firm*—Cullen, Sloman, Cantor, Grauer, Scott & Rutherford

[57] ABSTRACT

A split-flow nozzle for an energy beam system including a first hollow elongated sleeve and an elongated hollow electrode mounted radially interiorly of said sleeve and radially spaced apart from the sleeve to define an air gap therebetween. The hollow electrode closes one end of the sleeve and the hollow electrode has an aperture extending radially therethrough to define a fluid flow path between the interior of the electrode and the air gap between the electrode and the sleeve, so that when fluid is introduced into the hollow electrode, some of the fluid flows only through the electrode and some of the fluid flows through the electrode, through the aperture and through the air gap.

10 Claims, 6 Drawing Figures

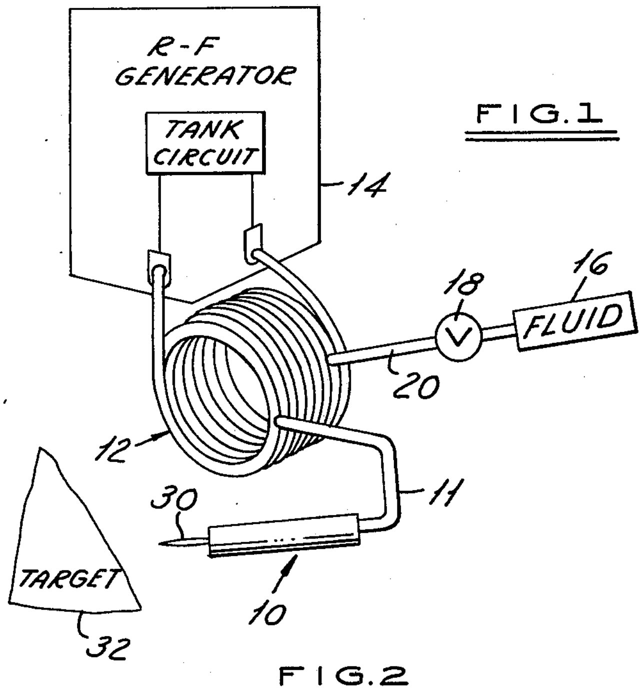
FIG. 1
FIG. 2
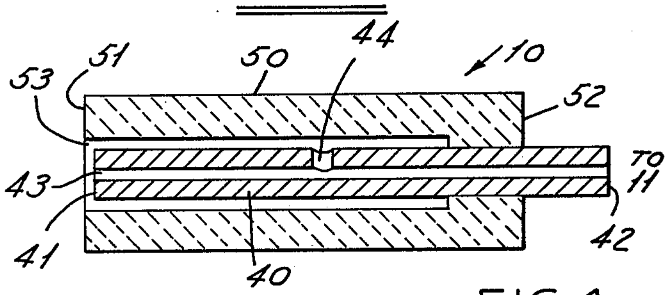
FIG. 3
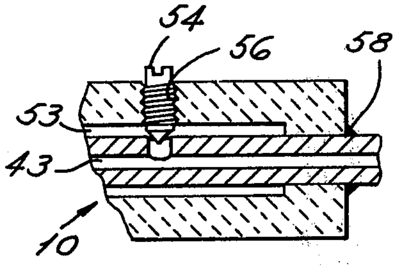
FIG. 4
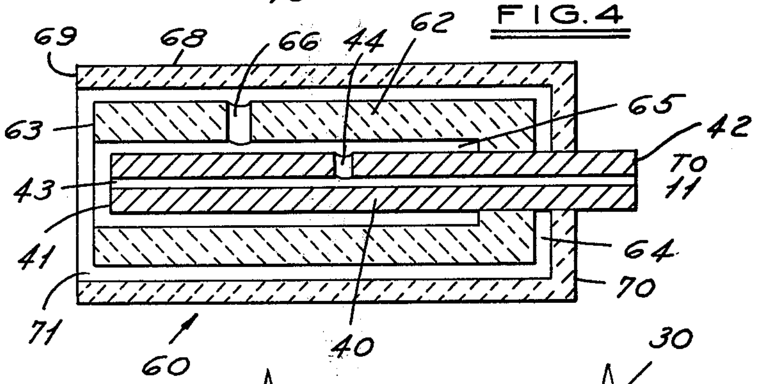
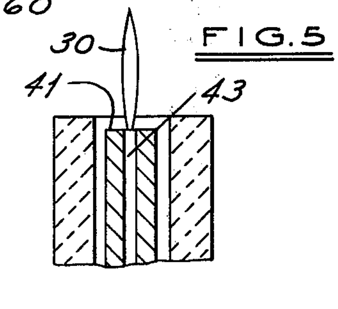
FIG. 5
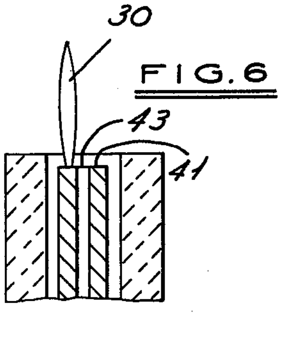
FIG. 6

SPLIT-FLOW NOZZLE FOR ENERGY BEAM SYSTEM

BACKGROUND OF THE INVENTION

This invention relates to a split-flow nozzle for an energy beam system of the type generally disclosed in my U.S. Pat. No. 3,648,015 issued Mar. 7, 1972, which is a system for generating a narrow radio frequency electronic beam outwardly from a nozzle with the ability to utilize such a beam for various purposes including for welding and for spraying a powder or aggregate as a coating upon a target.

The energy beam system itself includes, as set forth in my prior patent, a radio frequency generator having, as its output, a tank coil comprising a coiled metal tube which is actually a tube within a tube. A mechanical input in the form of a fluid is supplied to a high current low voltage point of the coil and the output from the tank coil is taken at a low current high voltage point and is coupled to a nozzle which has an electrode mounted therein.

When the radio frequency generator is actuated, and with a fluid or gas flowing through the coil and into the nozzle, a beam of energy emanates from the electrode and is conducted by the fluid to a target. A powder or aggregate, introduced through the nozzle, may be coated or deposited onto the target.

In my prior U.S. Pat. No. 3,894,209, issued July 8, 1975, I disclose an improved nozzle for an energy beam system which provides for laminar flow of fluid in two columns, one outside the electrode to sheath and surround the energy beam and the other flowing through the hollow electrode to conduct the energy beam to the target.

While the benefits of laminar flow of fluids or gases has been accurately described in my U.S. Pat. No. 3,894,209, there are many instances where it is not necessary for the tank coil to include a tube within a tube. This would be true, for example, when the energy beam is being utilized for low power heating or welding or coating purposes. In such environments, it is unnecessary for the tank coil to contain a tube interiorly of a tube but it is still desirable to provide for laminar flow of the fluid or gases emanating from the nozzle.

SUMMARY OF THE INVENTION

Thus the present invention provides a nozzle for an energy beam which receives gas from a tank coil and which splits the flow of the gas into two paths with the inner path conducting the beam of energy to the target and with the outer path surrounding and sheathing the energy beam. The split-flow nozzle of the present invention provides for a laminar flow of the gases but permits less expensive equipment to be utilized to supply the gases and the energy to the nozzle.

The split flow nozzle includes a hollow elongated electrode mounted radially interiorly of a hollow sleeve and spaced radially inwardly therefrom. The hollow electrode has an aperture extending radially therethrough so that a fluid flow path is established between the interior of the electrode and the space between the electrode and the sleeve. The gas or fluid entering the nozzle splits into two paths: one through the nozzle to conduct the beam to the target and one through the aperture and the space between the electrode and the sleeve to surround, sheath and focus the beam of energy.

BRIEF DESCRIPTION OF THE DRAWINGS

The various objects and advantages of the present invention will become more apparent upon reading the following detailed description of the invention taken in conjunction with the drawings.

In the drawings, wherein like reference numerals identify corresponding components:

FIG. 1 is a schematic illustration of an energy beam system;

FIG. 2 is a sectional view of a first embodiment of the improved split-flow nozzle of the present invention;

FIG. 3 is a partial sectional view of the split-flow nozzle of FIG. 2 illustrating the structure for varying the amount of fluid flowing in each path;

FIG. 4 is a sectional view of another embodiment of the split-flow nozzle of the present invention for providing three concentric laminar flow columns of fluid from the nozzle to the target;

FIG. 5 is a partial sectional illustration of the nozzle of the present invention illustrating the energy beam emanating from the center of the nozzle; and FIG. 6 is a partial sectional illustration of the improved nozzle of the present invention illustrating the energy beam offset from the center of the nozzle.

DETAILED DESCRIPTION OF THE INVENTION

The split-flow nozzle of the present invention is explained in the context of an energy beam system such as those described in my prior U.S. Pat. Nos. 3,648,015 and 3,894,209 each of which contains a description of the energy beam system and the principles and theories of operation together with the principles and theories of operation of a laminar flow nozzle. Therefore, the descriptions in those two patents are hereby incorporated by reference with it being understood that the nozzle 10 of the present invention is an improvement over the nozzles of the prior patents.

In order to explain the split-flow nozzle of the present invention, some of the details of the energy beam system are illustrated in FIG. 1. The nozzle 10 of the present invention is adapted to be connected by supply line 11 to a maximum voltage low current point of a tank coil 12 of a radio frequency sine wave generator 14. The tank coil may be made from a hollow copper tube.

A source of fluid 16 is connected through a valve 18 and through a supply line 20 to a maximum current low voltage point in the hollow tube or tank coil 12.

Upon activation of the radio frequency generator and turning on the fluid 16, an energy beam 30 emanates from the nozzle 10 and impinges on a target 32.

In the context of the present invention, the term "fluid" is used to generally include air, inert gases, and liquids whether or not solid particles are included in the liquid.

With reference next to FIGS. 2 and 3, a first embodiment of the split-flow nozzle of the present invention is illustrated including an elongated hollow electrode 40 having a first end 41 and a second end 42 to which the tank coil supply tube 11 is connected. The electrode may be force fit or threaded to the supply line 11. The electrode is hollow as at 43 and may be manufactured of a material such as molybdenum or tungsten rhenium, platinum or even stainless steel and the diameter of the hollow center may be approximately 1/16 inch. A radial aperture 44 is provided in the electrode intermediate its ends with the aperture 44 having a diameter of about 1/32 of an inch.

The electrode 40 is mounted interiorly of a hollow cylindrical sleeve 50 having a first end 51 and a second end 52. The electrode is radially spaced apart from the inside of the sleeve 50 to define an air gap 53 therebetween which is in the shape of a ring or annulus having a thickness of approximately 1/32 of an inch. The first end 41 of the electrode is recessed or indented or off-set inwardly from the first end 51 of the sleeve 50 by approximately 1/8 inch.

The second end of the sleeve is closed off by the hollow electrode 40 and the electrode 40 may be force-fit or frictionally retained in the second end of the sleeve. Alternatively, the sleeve 50 may initially be formed as a cup-shaped member of circular cross section with a hole bored in the base of the cup to receive the electrode therethrough. The sleeve 50 is made of a refractory material, i.e., a ceramic, such as boron nitride sold under the name "COMBAT" by the Carborundum Company, or a quartz or pyrex material.

When the nozzle 10 of FIG. 2 is connected by supply tube 11 to the tank coil 12 of the energy beam system and when the RF generator is actuated and valve 18 opened, the fluid flows through the valve 18 and the supply line 20, through the tank coil 12 and supply tube 11 and then into the hollow center 43 of the electrode 40.

A beam of energy emanates from the first end 41 of the electrode 40. The fluid flowing through the hollow electrode conducts the energy beam 30 to the target 32.

In addition, some of the fluid flowing through the hollow electrode is split off from the main flow path through the electrode and flows through the aperture 44 in the electrode and into the annulus or gap 53 between the electrode and the sleeve. The fluid in this gap 53 flows toward the first end 51 of the sleeve 50 and sheathes, surrounds or focuses the beam of energy.

Both the fluid flowing solely through the hollow electrode and the fluid flowing through both the electrode and the gap or annulus 53 continue independently of each other as they leave the nozzle. The flow of the fluid is referred to as laminar or columnar flow with each fluid maintaining straight or laminar flow (in cross section) from the nozzle to the target.

Since the fluid which flows between the electrode and the sleeve serves to focus the energy beam on the target, it may be appreciated that it is desirable to vary the amount of fluid flowing through the aperture 44 into the gap 53 between the sleeve and the electrode. This may be accomplished in one of several ways. First, a plurality of interchangeable electrodes may be provided each having an aperture 44 of a different diameter. However, to provide for more accurate adjustment, a needle valve may be provided as illustrated generally in FIG. 3 with the needle valve being a screw 54 threaded through the ceramic sleeve 50 and into a position where it can adjustably open and close the aperture in the electrode. For this purpose, a threaded aperture 56 in the ceramic sleeve is provided.

Additionally, the embodiment of FIG. 3 illustrates that in lieu of a friction or force-fit, the electrode 40 and the ceramic sleeve 50 may be welded together at the second end of the sleeve as illustrated by the welds 58.

The split-flow nozzle as described above and the system with which it is used are less expensive than the systems described in my prior patents and while providing a lower power output, the power is sufficient for welding and general purpose energy beam operation. Even though the tube within a tube in the tank coil has been eliminated, the split-flow nozzle still protects the hollow electrode from oxidation and still provides a sheath to surround the beam and focus the beam on the target.

Since the nozzle of the present invention contemplates the use of an electrode of tungsten or stainless steel or preferably molybdenum an inert fluid 16 is required such as those described in any of my prior patents. However, if a non-oxidizing electrode is utilized, such as a rhenium-plated electrode, or if the electrode is operated inside a radiant tube or in an inert atmosphere, then any fluid including air, steam or any of the inert gases may be utilized.

Reference to FIG. 4 illustrates another embodiment of the split-flow nozzle 60 including the hollow electrode 40 having a radial aperture 44 and a first refractory or ceramic sleeve 62 having first and second ends 63,64 respectively. The first sleeve 62 is spaced radially outwardly from the electrode to define an annular air gap 65 therebetween and the second end 64 of the sleeve is closed by the electrode being positioned therethrough similar to the embodiment of FIG. 2.

The first hollow refractory sleeve 62 includes an aperture 66 extending radially therethrough and the aperture 66 is longitudinally spaced apart from the aperture 44 in the electrode.

A second refractory or ceramic sleeve 68 is positioned radially exteriorly of the first sleeve with the second sleeve 68 having first and second ends 69,70 respectively and being radially spaced apart from the first sleeve to define an annular air gap 71 therebetween. The second end 70 of the second sleeve is also closed by the electrode 40 extending therethrough and the electrode may be either force-fit or welded to the second ends of each of the first and second sleeves. The end 41 of electrode 40 is again offset inwardly from the end 63 of the first sleeve and, additionally, the end 63 of the first sleeve is offset inwardly from the end 69 of the second sleeve.

When fluid is introduced directly into the second end 42 of the electrode of the nozzle of FIG. 4, the flow of fluid is split along three paths. The first path is through the hollow electrode to conduct the beam to the target. The second flow of fluid is partially through the electrode through the first aperture 44 in the electrode and then through the air gap 65 between the electrode and the first ceramic sleeve. The third fluid flow path is through the center of the electrode, through the aperture 44 in the electrode and into the air gap 65 between the electrode and the first sleeve, through the aperture 66 in the first sleeve and into the air gap 71 between the first sleeve and the second sleeve.

Each of these fluid flow paths provides laminar or columnar flow of fluid from the end of the nozzle toward the target. The fluid flow path through the electrode serves to conduct the beam of energy to the target as described previously and the fluid flow path through the electrode, through the aperture in the electrode and through the gap between the electrode and the first sleeve serves to surround and focus the energy beam and direct the energy beam toward the target.

However, with the construction of FIG. 4, a surprising result is obtained. The fluid flow path from the electrode through both apertures 44 and 66 into the gap between the two sleeves provides a laminar gas flow which provides its function at the target by preventing oxidation of the target. Thus, by splitting the flow of the fluid twice, oxidation is prevented at the electrode and at the target and a longer beam is focused at the target.

The needle valve described with respect to FIG. 3 for controlling the relative size of the radial aperture in the hollow electrode, and thus controlling the relative portion of fluid split off into each flow path, may be utilized for each aperture in the embodiment of FIG. 4.

With respect to FIGS. 5 and 6, the effect of this control may be explained. FIG. 5 illustrates, schematically, a normal split flow operation with the energy beam 30 emanating from the center of the electrode of a nozzle such as the type shown in FIG. 2 or FIG. 4. FIG. 6 illustrates the movement of the flame off center as the sheath fluid flow is increased in proportion to the fluid flow solely through the center of the hollow electrode. This movement of the beam may be accomplished by enlarging the size of the aperture 44 in the hollow electrode and aperture 66 in the first sleeve, each of which may be accomplished by opening the respective needle valves.

One benefit from moving the beam 30 off-center relative to the hollow electrode 40 is to enable the nozzle to be used in a spray coating environment. Using the nozzle of FIGS. 2 or 3 and introducing both the fluid and the powder through the center of the electrode 40 would normally cause the powder to fuse to the first end 41 of the electrode. This fusing is caused by the heat of the energy beam at the electrode tip. By increasing the size of the radial aperture 44 in the hollow electrode and thus increasing the fluid flow in the path which surrounds and focuses the beam, I have discovered that the beam will be moved off center of the electrode as illustrated in FIG. 6 and this eliminates the fusing of the powder to the electrode. The beam automatically returns to its centered position about ¼ inch away from the first end 43 of the electrode.

The foregoing is a complete description of a preferred embodiment of the present invention. Many changes may be made without departing from the spirit and scope of the present invention. Hence the invention should be limited only by the scope of the following Claims.

What is claimed is:

1. In an apparatus for generating an energy beam, said apparatus including a sine wave generator having a tank coil formed of a hollow electrically conductive tube, and a system for supplying fluid through said tube, the improvement of a nozzle adapted to be attached at one end of said tube comprising:
- a first hollow elongated sleeve having first and second ends;
- an elongated hollow electrode having first and second ends and a central passage therethrough, said hollow electrode being mounted radially interiorly of said first sleeve and spaced radially interiorly thereof to define an air gap therebetween;
- said hollow electrode closing the second end of said first sleeve;
- the first end of said hollow electrode being recessed axially inwardly of the first end of said first sleeve; and
- an aperture extending radially through said hollow electrode to define a fluid path between said passage of said hollow electrode and said air gap;
- whereby upon the application of fluid through said tube and upon activating said sine wave generator, a laminar fluid flow is produced by said nozzle including an inner column of fluid flowing solely through said electrode and emanating outwardly from said nozzle at the electrode first end and conducting said energy beam to a target, and simultaneously a second column of fluid flowing through said aperture and said air gap and emanating between said electrode first end and said first sleeve first end and surrounding and sheathing said energy beam.

2. The invention as defined in claim 1 wherein the size of the opening of said aperture is adjustable to vary the amount of fluid flowing through said aperture and through said air gap.

3. The invention as defined in claim 1 wherein said electrode is frictionally retained in the second end of said first hollow sleeve.

4. The invention as defined in claim 1 and further including a second hollow elongated sleeve having first and second ends;
- said first sleeve being mounted radially interiorly of said second sleeve and spaced radially interiorly thereof to define a second air gap therebetween;
- the first end of said first sleeve being recessed axially inwardly from the first end of said second sleeve; and
- an aperture extending radially through said first hollow sleeve to define a second fluid flow path between said first air gap and said second air gap;
- said aperture in said first sleeve being longitudinally offset from the aperture in said electrode so that upon application of fluid and activating said sine wave generator, said laminar fluid flow includes simultaneously a third column of fluid flowing through said second air gap and emanating in laminar flow between said first sleeve first end and said second sleeve first end and surrounding said second column of fluid, to prevent oxidation of a target at which said energy beam is directed.

5. The invention as defined in claim 4 wherein the second end of said second sleeve is closed by the second end of the hollow electrode.

6. The invention as defined in claim 4 wherein the size of the openings of said apertures are adjustable to vary the amount of fluid flowing through said apertures and through said air gaps.

7. An improved nozzle comprising:
- a first hollow elongated straight sleeve having first and second ends;
- an elongated straight hollow electrode having a central passage therethrough and having first and second ends, said hollow electrode being mounted radially interiorly of said first sleeve and radially spaced apart therefrom to define a uniform annular air gap therebetween;
- said hollow electrode second end closing said second end of said first sleeve;
- the first end of said hollow electrode being recessed axially inwardly of the first end of said first sleeve; and
- an aperture extending radially through said hollow electrode to define a fluid flow path between said central passage the interior of said electrode and said air gap.

8. The invention as defined in claim 7 and further including a second straight hollow elongated sleeve having first and second ends;
- said second sleeve being mounted radially exteriorly of said first sleeve and radially spaced apart therefrom to define a second uniform annular air gap therebetween;

the electrode second end closing the second end of said second sleeve;

the first end of said first sleeve being recessed axially inwardly from the first end of said second sleeve; and an aperture extending radially through said first hollow sleeve to define a second fluid flow path between said first air gap and said second air gap;

said aperture in said first sleeve being longitudinally offset from the aperture in said electrode.

9. A method of positioning the beam of energy emanating from the electrode of an energy beam system, said energy beam system including a sine wave generator having a tank coil formed of a hollow electrically conductive tube, and a system for supplying fluid through said tube to a nozzle adapted to be attached at one end of said tube, comprising the steps of:

positioning an elongated hollow electrode having a central passage therethrough radially interiorly and axially inwardly of said sleeve and spaced apart therefrom to define an air gap therebetween, said electrode having an aperture therethrough to interconnect said central passage of the hollow electrode with the air gap; and adjusting the amount of fluid flowing through said aperture and through said air gap so that a laminar fluid flow is produced by said nozzle including an inner column of fluid emanating from said nozzle and conducting said energy beam to a target and a second fluid flow path through the hollow nozzle, through said aperture and through said air gap and emanating as a second column of fluid between said electrode and said first sleeve and surrounding and sheathing and focusing said beam of energy;

said energy beam emanating from a position offset from the center of said hollow electrode.

10. The invention as defined in claim 9 wherein said beam is offset from the center of the electrode by varying the size of the opening of the aperture interconnecting the hollow electrode and said air gap between said electrode and said sleeve.

* * * * *